United States Patent
Umeda (10) Patent No.: US 12,523,715 B2
(45) Date of Patent: Jan. 13, 2026

(54) DETECTION DEVICE, MEASUREMENT DEVICE, METHOD FOR DETECTING CONNECTOR LOOSENESS AND PROGRAM

(71) Applicant: NEC Platforms, Ltd., Kawasaki (JP)

(72) Inventor: Naoki Umeda, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 205 days.

(21) Appl. No.: 18/221,193

(22) Filed: Jul. 12, 2023

(65) Prior Publication Data
US 2024/0027544 A1    Jan. 25, 2024

(30) Foreign Application Priority Data
Jul. 21, 2022  (JP) .................... 2022-116606

(51) Int. Cl.
*G01R 31/66* (2020.01)
(52) U.S. Cl.
CPC .................... *G01R 31/66* (2020.01)
(58) Field of Classification Search
CPC .............................. G01R 31/66; G01R 31/69
See application file for complete search history.

(56) References Cited

U.S. PATENT DOCUMENTS

| | | | | |
|---|---|---|---|---|
| 4,647,209 A * | 3/1987 | Neukomm | ............... | G01S 17/48 356/3.05 |
| 2002/0066193 A1* | 6/2002 | Hodge | ................ | G01B 5/0025 33/288 |
| 2009/0081902 A1* | 3/2009 | Montena | ................ | H01R 24/42 439/578 |
| 2019/0049673 A1* | 2/2019 | Takeuchi | ............. | G02B 6/3895 |
| 2020/0076140 A1 | 3/2020 | Ketzer et al. | | |

FOREIGN PATENT DOCUMENTS

| | | |
|---|---|---|
| JP | H02-052285 U | 4/1990 |
| JP | H05-008880 U | 2/1993 |
| JP | H07-057819 A | 3/1995 |
| JP | 2004-309132 A | 11/2004 |
| JP | 2006-112893 A | 4/2006 |
| JP | 2015-35849 A | 2/2015 |

OTHER PUBLICATIONS

Office Action issued Jul. 4, 2023 in Japanese Application No. 2022-116606.

* cited by examiner

*Primary Examiner* — Akm Zakaria
(74) *Attorney, Agent, or Firm* — Sughrue Mion, PLLC (57) ABSTRACT

A detection device that fits a second connector provided on a tip of a cable and detects looseness at a connection portion between a first connector to which the cable is connected and the second connector includes a sensor that detects a distance to a tip face of the second connector in a sealed space formed in a state where the first connector and the second connector are fitted to each other; a controller that gives an output instruction to output a predetermined signal when the distance has changed by a predetermined threshold value or more from a reference distance, the reference distance being the distance at a predetermined reference time; and an output device that outputs the predetermined signal according to the output instruction.

18 Claims, 4 Drawing Sheets

DETECTION DEVICE, MEASUREMENT DEVICE, METHOD FOR DETECTING CONNECTOR LOOSENESS AND PROGRAM

FIELD

Cross Reference to Related Applications

This application is based upon and claims the benefit of the priority of Japanese patent application No. 2022-116606, filed on Jul. 21, 2022, the disclosure of which is incorporated herein in its entirety by reference thereto. This invention relates to a connector looseness detection technology of a measurement device.

BACKGROUND

A vector network analyzer (VNA) is a measurement device that can remove an influence of the measurement system by calibration and extract only a characteristic value (transmission characteristics such as S-parameters) of a device under test (DUT). The VNA is provided with a coaxial connector to connect a coaxial cable, etc. The VNA is connected to the DUT with a coaxial cable via the coaxial connector and measures the DUT. However, a looseness of torque at a connection portion of the coaxial connector may occur during measurement. If looseness occurs at the connection portion of the coaxial connector, the calibrated state is collapsed, and an accuracy of the subsequent measurement values cannot be guaranteed. Consequently, the measurement data will be unreliable.

As a technique for detecting a connection status of a coaxial connector, there is a coaxial connector with an indication mechanism that generates a signal indicating connection to at least one of a coaxial plug and a coaxial jack when the coaxial plug is completely joined to the coaxial jack (see, for example, Patent Literature (PTL) 3).

There is a connector provided with a through hole, which is cut off and released by a plug, for light transmission in the receptacle, a light emitting element of an optical sensor provided in one opening of the through hole, a light receiving element in another opening of the through hole, and a control circuit. The control circuit, when the optical sensor detects that a light passing through the through hole is blocked, confirms a connection state of the connector and controls a power supply of an internal circuit to an energized state (see, for example, PTL 1).

There is a high-frequency connector, which is provided with a piezoelectric element that is compressed as a plug is fitted with the receptacle and a means for detecting a voltage generated by compression of the piezoelectric element to display, can easily detect whether the fitting state between the plug and the receptacle is normal or not (see, for example, PTL 2).

PTL 1: Japanese Unexamined Patent Application Publication No. H07-057819 A
PTL 2: Japanese Utility Model Application Publication No. H05-008880 U
PTL 3: Japanese Utility Model Application Publication No. H02-052285 U

SUMMARY

The following analysis has been made by the present inventor.

As mentioned above, there are three technical issues in detecting the looseness of a coaxial connector on a measurement device such as a VNA.
1) How to detect the looseness of torque at the connection portion of the coaxial connector where the VNA and the coaxial cable are connected after the connection and calibration are completed.
2) How to set the reference to determine the looseness of torque at the connection portion of the coaxial connector.
3) How to ensure that the mechanism of detecting looseness of torque at the connection portion of the coaxial connector does not affect the measurement data.

The techniques disclosed in PTL 1 to 3 can only determine whether or not the plug and the jack (receptacle) are fitted to each other, and cannot solve the above problem. Therefore, the measurement accuracy of the measurement device cannot be maintained, and the reliability of measurement results may not be ensured.

It is a purpose of the present invention, made in view of the above circumstances, to contribute to maintaining the measurement accuracy of the measurement device and to ensuring the reliability of measurement results.

According to a first aspect of the present invention, there is provided a detection device that fits a second connector provided on a tip of a cable and detects looseness at a connection portion between a first connector to which the cable is connected and the second connector, comprising:
  a sensor that detects a distance to a tip face of the second connector in a sealed space formed in a state where the first connector and the second connector are fitted to each other;
  a controller that gives an output instruction to output a predetermined signal when the distance has changed by a predetermined threshold value or more from a reference distance, the reference distance being a distance at a predetermined reference time; and
  an output device that outputs the predetermined signal according to the output instruction.

According to a second aspect of the present invention, there is provided a measurement device, comprising:
  the detection device according to first aspect;
  the first connector;
  at least a processor, and
  a memory in circuit communication with the processor, wherein the processor is configured to execute program instructions stored in the memory to implement:
  a measurement part that measures a characteristic value of a device under test connected by the cable.

According to a third aspect of the present invention,
there is provided a method for detecting a connector looseness by a computer provided in a measurement device, the method comprising: detecting a distance from a sensor to a tip face of a second connector in a sealed space formed in a state where a first connector and the second connector are fitted to each other, the first connector being attached to the measurement device, the second connector being provided on a tip of a cable;
  giving an output instruction to output a predetermined signal when the distance has changed by a predetermined threshold value or more from a reference distance, the reference distance being a distance at a predetermined reference time; and
  outputting the predetermined signal according to the output instruction.

According to a fourth aspect of the present invention, there is provided a non-transitory computer-readable medium storing therein a program causing a computer to execute processing comprising: detecting a distance from a sensor to a tip face of a second connector in a sealed space formed in a state where a first connector and the second connector are fitted to each other, the first connector being attached to the measurement device, the second connector being provided on a tip of a cable;

giving an output instruction to output a predetermined signal when the distance has changed by a predetermined threshold value or more from a reference distance, the reference distance being a distance at a predetermined reference time; and outputting the predetermined signal according to the output instruction.

Note that these programs can be recorded on computer-readable storage media. The storage media may be non-transient storage media such as semiconductor memories, hard disks, magnetic recording media, and optical recording media, for example. The present invention can be embodied as a computer program product.

According to the present invention, it is possible to contribute to maintaining the measurement accuracy of the measurement device and to ensuring the reliability of measurement results.

EXAMPLE EMBODIMENTS

Now, an example embodiment of the present invention (hereinafter it is referred to as present example embodiment) will be described with reference to the drawings. In the following outline, various components are denoted by reference characters for the sake of convenience. That is, the following reference characters are merely used as examples to facilitate understanding of the present invention. Thus, the description of the outline is not meant to limit the present invention to the illustrated modes. An individual connection line between blocks in the drawings, etc. referred to in the following description signifies both one-way and two-way directions. An arrow schematically illustrates a principal signal (data) flow and does not exclude bidirectionality.

A program is executed via a computer apparatus, and the computer apparatus includes, for example, a processor, a storage device, an input device, a communication interface, and as needed, a display device. In addition, this computer apparatus is configured such that the computer apparatus can communicate with its internal device or an external device (including a computer) via the communication interface in a wired or wireless manner. In addition, while a port or an interface is present at an input/output connection point of an individual block in the relevant drawings, illustration of the port or the interface is omitted. In addition, in the following description, "A and/or B" signifies A or B or A and B.

In the present example embodiment, a measurement device is connected to a device under test (DUT) with a coaxial cable to measure the DUT. Prior to measurement, the measurement device performs calibration under a state that a calibration reference device is connected (the state that the measurement device and the calibration reference device are connected with a coaxial cable). Calibration defines a reference surface of measurement and enables measurement of how characteristics of the DUT have changed relative to the reference surface.

In the present example embodiment, a distance from a predetermined position to a tip portion (tip face) of an external conductor of a coaxial connector on a cable side is detected, in an external conductor of a coaxial connector on the measurement device side, in a state of at a time of measurement, to detect an amount of change (a difference) from a predetermined reference distance. The coaxial connector on the cable side is provided at a tip of the coaxial cable. The coaxial connector on the measurement device side is provided in the measurement device. If the difference exceeds a predetermined threshold value, a warning is outputted to a user.

Hereinafter, an example using a case in which the coaxial connector on the measurement device side is a male connector (first connector) and the coaxial connector on the cable side is a female connector (second connector) is described. They are referred to as a "male connector" and a "female connector," respectively, and when there is no need to distinguish between them, they are simply referred to as a "connector".

Prior to describing the measurement device of the present example embodiment, shapes of the male connector and the female connector coupled thereto are described briefly.

Figure 1A:
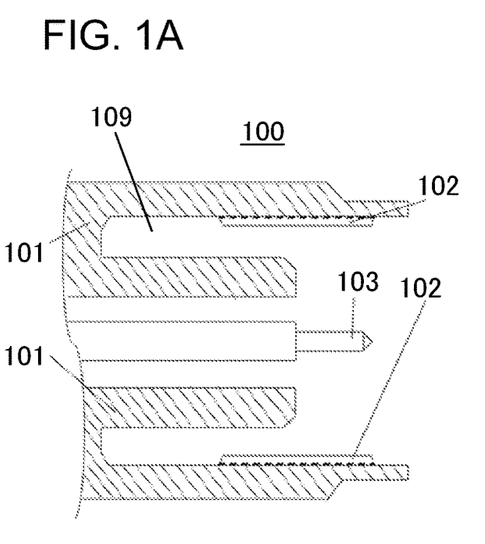
FIG. 1A is a cross-sectional view of a male connector according to one example embodiment of the present invention.
Figure 1B:
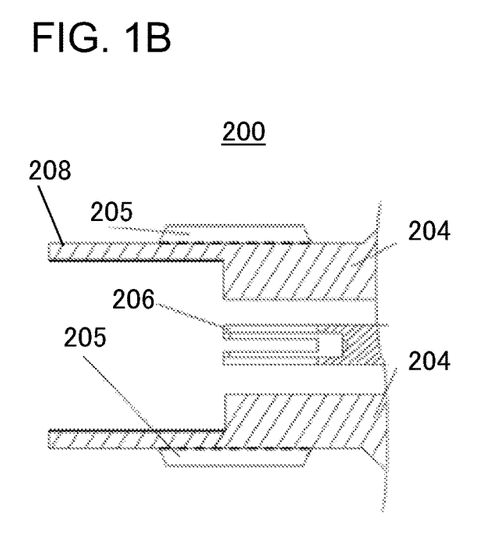
FIG. 1B is a cross-sectional view of a female connector according to the example embodiment of the present invention.

FIG. 1A and FIG. 1B are cross-sectional views of a male connector 100 and a female connector 200, respectively.

As illustrated in FIG. 1A, the male connector 100 has a structure preventing misalignment and is provided with an external conductor 101, a screw thread (female screw) 102 engraved on the external conductor 101, and a central conductor (signal pin) 103 passing a signal. Inside the external conductor 101, an annular groove portion 109 having a predetermined depth in an axial direction is formed. The central conductor 103 is formed in a pin-shape and is formed to fit into a central conductor 206 of the female connector 200 described below when the male connector 100 and the female connector 200 are fitted to each other.

As illustrated in FIG. 1B, the female connector 200 has a structure preventing misalignment and is provided with an external conductor 204, a screw portion (male screw) 205 processed on the external conductor 204, and a central conductor 206 connecting to the central conductor 103. The external conductor 204 has a protruding portion 208 engaging in the groove portion 109 of the male connector 100. The female connector is attached, for example, to the end (tip) of a coaxial cable.

Figure 1C:
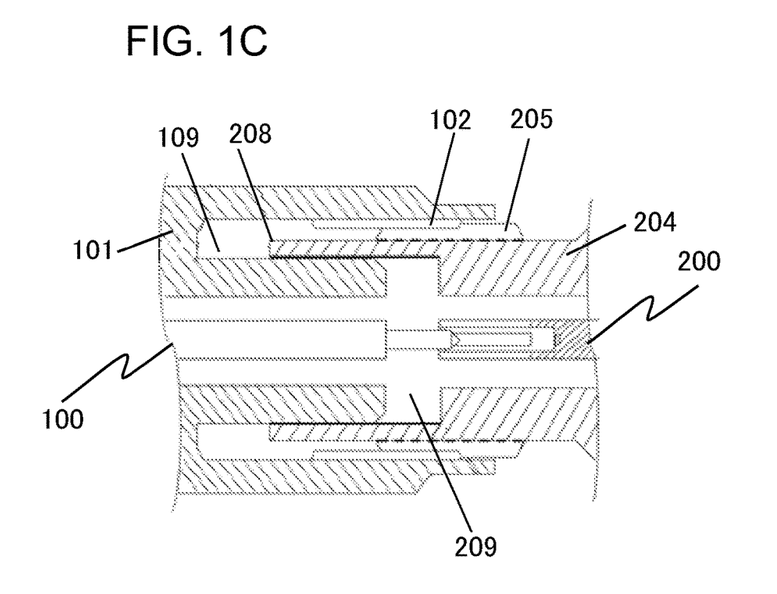
FIG. 1C is a cross sectional view where the male connector and the female connector according to the example embodiment of the present invention are fitted to each other.

FIG. 1C illustrates a cross-sectional view of which the male connector 100 and the female connector 200 are screwed together via mutual rotation at a default torque to be in a connected and conducting state (in a fitted state). As shown in FIG. 1C, the protruding portion 208 of the female connector 200 is inserted into the groove portion 109 of the male connector 100, and the screw thread 102 and the screw portion 205 are screwed together to electrically or optically connect the male connector 100 and the female connector 200.

When the male connector 100 and the female connector 200 are fitted to each other, the groove portion 109 becomes a sealed space enclosed by the external conductor 101, the external conductor 204, the screw thread 102, and the screw portions 205. When both connectors are fitted to each other, a region 209 becomes a sealed space enclosed by the external conductor 101 and the external conductor 204. A measurement device 300 according to the present example embodiment detects a misalignment of the male connector 100 and the female connector 200 when they are fitted to each other.

[Functional Configuration]

Figure 2A:
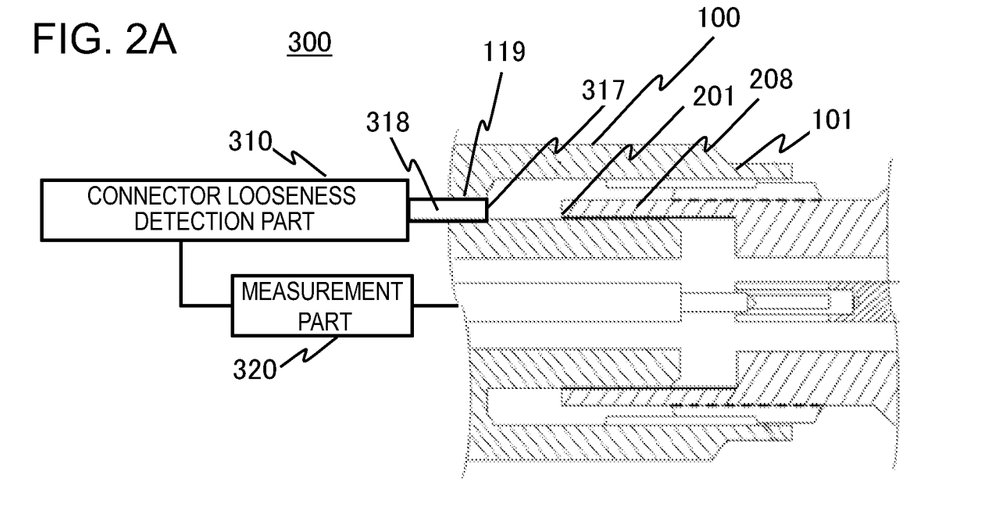
FIG. 2A is a functional block diagram of a measurement device according to the example embodiment of the present invention.

Next, the measurement device 300 according to the present example embodiment is described. FIG. 2A illustrates a configuration of the measurement device 300. As illustrated in FIG. 2A, the measurement device 300 is provided with the male connector 100 as a connection interface to a coaxial cable. Also, the measurement device 300 is provided with a connector looseness detection part 310 (detection device) and a measurement part 320 for measuring a characteristic amount of the DUT, as functions. The measurement part 320 outputs a signal of specific frequency to the DUT via the central conductor 103 and measures its response as the characteristic amount of the DUT.

The connector looseness detection part 310 functions as a detection device to detect looseness of torque at a connection portion between the male connector 100 and the female connector 200 that is connected to the male connector 100. Concretely, the connector looseness detection part 310 detects a displacement of the female connector 200 from a state in which the male connector 100 and the female connector 200 are fitted to each other by being screwed together with a specified torque.

Figure 2B:
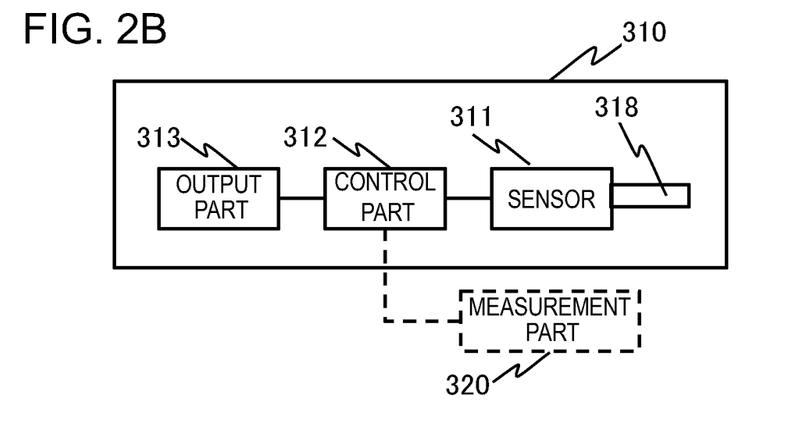
FIG. 2B is a functional block diagram of a detection part (detection device) according to the example embodiment of the present invention.

For realizing above, the connector looseness detection part 310 is provided with a sensor 311, a control part (controller) 312, and an output part (output device) 313, as illustrated in FIG. 2B.

The sensor 311 detects a distance to/from the female connector 200. In the present example embodiment, for example, an optical sensor that detects a distance to an object using a laser beam is used as the sensor 311. For this purpose, the sensor 311 is provided with an optical fiber 318 that emits light from its tip.

Figure 3:
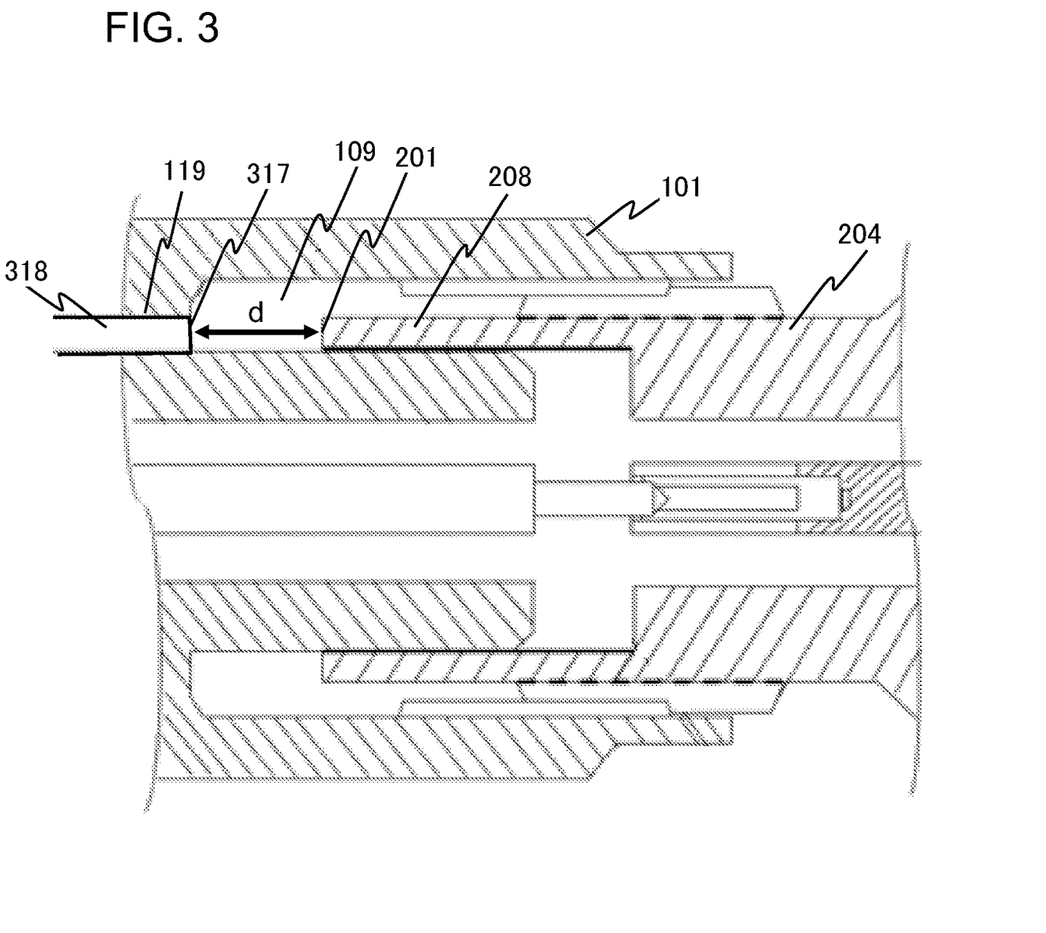
FIG. 3 is an explanatory diagram illustrating a measurement of an end-face-to-end-face distance according to the example embodiment of the present invention.

In the present example embodiment, the optical fiber 318 is inserted into a through hole 119 provided in the external conductor 101, as illustrated in FIG. 2A and FIG. 3. The through hole 119 is provided at a bottom of the groove portion 109, piercing the external conductor 101 from the outside of the external conductor 101 to the groove portion 109. The position of a tip face 317 of the optical fiber 318 is fixed. For example, the tip face 317 is fixed in a same plane as a plane (bottom) of the groove portion 109 side of the external conductor 101. The through hole 119 has a diameter suitable for inserting the optical fiber 318, for example, a diameter approximately the same size as a diameter of the optical fiber 318.

The sensor 311 emits light from the tip face 317 of the optical fiber 318 according to an instruction from the control part 312 and detects a distance d to the tip face 201 of the protruding portion 208 of the female connector 200, as illustrated in FIG. 3. Hereinafter the distance d is referred to as an end-face-to-end-face distance. In other words, the sensor 311 detects a distance from an emitting surface to the tip face 201 (tip position) of the protruding portion 208. The sensor 311 outputs a detection result (end-face-to-end-face distance d) to the control part 312.

The control part 312 controls an operation of the sensor 311 and calculates a displacement amount (difference in distance value) of the female connector 200 from the detection result to determine whether or not an output of a predetermined signal is required. Concretely, control part 312 performs following processings.

The control part 312 gives emission instructions (detection instructions) to the sensor 311. The detection instructions are given, for example, periodically or in accordance with signals (event signals) from the measurement part 320. The event signals are outputted, for example, at a time when various events of the measurement part 320 occur, or at a predetermined time corresponding to an occurrence of each of the various events. In other words, the control part 312 gives detection instructions to the sensor 311 in response to the occurrence of various events.

The various events are, for example, an end of calibration, a start of frequency sweep of input/output signal, an end of frequency sweep, etc. The measurement part 320 outputs event signals, for example, at a time that is a predetermined time back from the start of frequency sweep of input/output signal and at a time that is a predetermined time elapsed from the end of frequency sweep of input/output signal. In response to this, the control part 312 outputs detection instructions before the start of frequency sweep of input/output signal, after the end of frequency sweep of input/output signal, and so on. In addition, the control part 312 may give detection instructions at the time when there is no input/output signal in measurement part 320. The occurrence of various events may be detected separately and input externally, or detected by an element incorporated as a part of the connector looseness detection part 310.

According to the present example embodiment, the control part 312 instructs the measurement part 320 to stop measurement for a predetermined period of time before giving detection instructions to the sensor 311. This is to eliminate an influence of an end-face-to-end-face distance detection on a measurement in the measurement part 320. The predetermined period is predetermined, for example, based on a period T from a time when the control part 312 gives the detection instruction to a time when the detection result is received from the sensor 311, such as a minimum value exceeding T.

It is possible to configure the control part 312 to send an instruction to resume measurement to the measurement part 320 after an instruction to stop measurement, without specifying a stop period. When detection instructions are given at a time when there is no input/output signal, the instruction to stop measurement may not be given.

In addition, the control part 312 processes the detection results (end-face-to-end-face distance d) obtained from the sensor 311 in response to detection instructions. First, the control part 312 stores the detection results corresponding to the time at which the detection instructions were given. The control part 312 also determines a reference detection result (a reference value; a reference distance) among the stored detection results. In the present example embodiment, for example, the control part 312 uses the detection result at a completion of calibration as the reference distance. The control part 312 then compares the detection result obtained with the reference distance and calculates a difference as an amount of displacement. The control part 312 may store the difference as well as the detection result.

If the calculated difference is greater than or equal to a predetermined threshold value, the control part 312 outputs an instruction to output a predetermined signal to the output part 313. In the present example embodiment, the control part 312 outputs a warning output instruction to output a warning, for example. The threshold value is set, for example, to any value within a range (allowable range) where the difference does not affect the measurement (value) in the measurement part 320.

Here is an example of a method for obtaining the reference distance. When the measurement device 300 is a VNA, calibration is performed in a state that a measurement system is constructed. The measurement system includes a VNA, a calibration reference device, and a coaxial cable connecting the VNA and the calibration reference device. The calibration reference device includes a calibration jig, which is connected to an end face of the coaxial connector, and/or a calibration module. For example, the measurement device 300 connects them to perform calibration, and the end-face-to-end-face distance d detected in a state that the calibration is completed is used as the reference distance.

For example, upon receiving a signal from the measurement part 320 indicating that calibration has been completed, the control part 312 issues a detection instruction to the sensor 311 and causes it to detect.

When the output part 313 receives an instruction to output a predetermined signal, for example, the warning output instruction, from control part 312, it outputs the predetermined signal, for example, a warning, to an output device. The output device is, for example, a display device, a speaker, or the like provided by the measurement device 300. If the output device is a display device, a warning message is displayed. If the output device is a speaker, a warning sound is outputted. This allows a user to recognize that a looseness has occurred at a connection portion of the coaxial connectors (the male connector 100 and the female connector 200) connecting the measurement device 300 and the coaxial cable, i.e., that the calibrated state is collapsed.

The measurement part 320 performs normal measurement processing, including calibration processing of the measurement device 300. However, in the present example embodiment, the measurement part 320 outputs an event signal to the connector looseness detection part 310 when a predetermined event occurs. When the measurement part 320 receives the stop instruction from the connector looseness detection part 310, it stops the measurement processing for a predetermined period of time, as described above.

The event signal may be outputted when the input/output of the measurement part 320 is intentionally stopped. The event signal may also be outputted in response to an instruction from the user. The instruction from the user is, for example, inputted from the input device, etc. described below, when the distance is detected independently of the processing of the measurement part 320.

Each part of the connector looseness detection part 310 may operate on the OS (Operation System) of the measurement part 320. Each part of the connector looseness detection part 310 receives event signals from the measurement part 320 and performs detection control based thereon, thereby enabling it to detect the end-face-to-end-face distance d in cooperation with the signal input/output of the measurement part 320.

[Hardware Configuration]

Figure 2C:
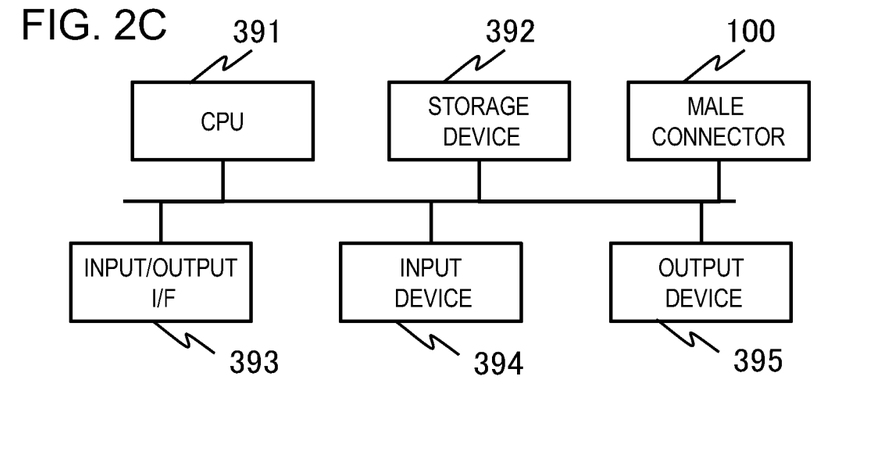
FIG. 2C is a hardware configuration diagram of the measurement device according to the example embodiment of the present invention.

For example, the measurement device 300 according to the present example embodiment is provided with a CPU (Central Processing Unit) 391, a storage device 392, an input/output interface (I/F) 393, an input device 394, an output device 395, and the male connector 100 (coaxial connector), which are mutually connected with an inner bus.

The CPU 391 loads the program stored in a nonvolatile region of the storage device 392 into a work region and executes it to realize each functions described above and to comprehensively control an overall operation of the measurement device 300. One or more processors such as an MPU (Micro Processing Unit) may be used instead of the CPU 391.

The storage device 392 is provided with a memory such as ROM (Read Only Memory) and/or RAM (Random Access Memory). The storage device 392 stores programs to execute each function, information necessary for various processes, and data generated by the processings, etc. In the present example embodiment, for example, the distance value acquired by the sensor 311 and the difference calculated by the control part 312 may be stored in association with an acquisition time of the end-face-to-end-face distance d.

In addition to memories such as ROM and/or RAM, the storage device 392 may be provided with storage media, for example, SSD (Solid State Drive), flexible disk, hard disk, optical disk, CD-ROM, CD-R, magnetic tape, non-volatile memory cards, DVDs, etc. The storage device 392 may be provided with multiple memories, etc.

The input/output I/F 393 is an interface for inputting and outputting data to and from external devices. The measurement device 300 may be provided with a communication interface for connecting it to a network separately from or instead of the input/output I/F 393.

The male connector 100 is a connection interface of the coaxial cable.

The input device 394 accepts input from the user. The input device 394 is realized, for example, by a mouse, keyboard, built-in key buttons, etc., and is used for input operations. The input device 394 is not limited to these, but can also be a touch panel, for example. The output device 395 is hardware used to output predetermined signals such as warnings, etc., and is realized, for example, as a display or a speaker. The display displays warning messages and the speaker outputs warning sounds.

The hardware configuration of the measurement device 300 is not limited to this; the measurement device 300 may include hardware not illustrated. Alternatively, the number of CPUs 391, etc. included in the measurement device 300 is also not limited.

[Reference Distance Acquisition Processing]

Figure 4A:
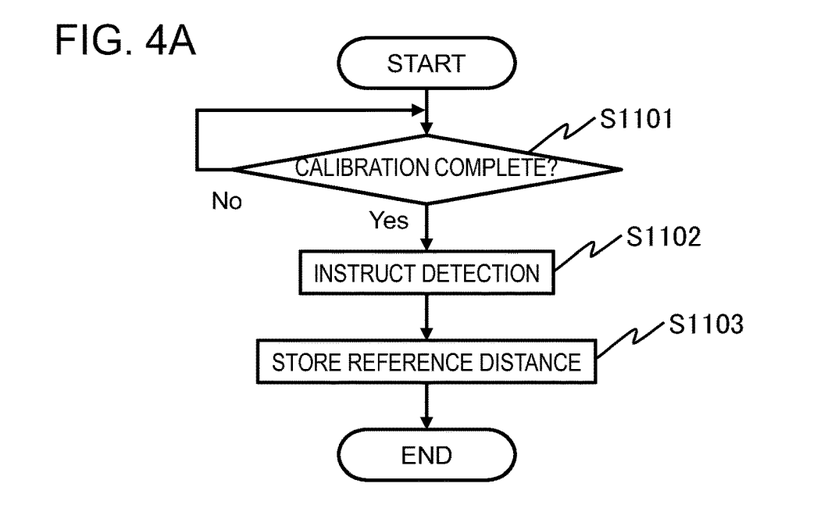
FIG. 4A is a flowchart of reference distance acquisition processing according to the example embodiment of the present invention.

Next, a flow of a reference distance acquisition processing by the measurement device 300 of the present example embodiment is described. FIG. 4A is a flowchart of the reference distance acquisition processing according to the present example embodiment. The reference distance acquisition processing is performed upon completion of calibration. Calibration is performed in a state that the calibration reference device is connected to the measurement device 300 by a coaxial cable.

The control part 312 waits for receipt of an event signal from the measurement part 320 indicating completion of calibration (step S1101). Upon receipt of the event signal, the control part 312 gives a detection instruction to the sensor 311 (step S1102).

In response to the detection instruction, the sensor 311 performs detection. Upon receipt of an end-face-to-end-face distance d as a detection result, the control part 312 stores it as a reference distance (step 1103) and terminates the processing.

[Connector Looseness Detection Processing]

Figure 4B:
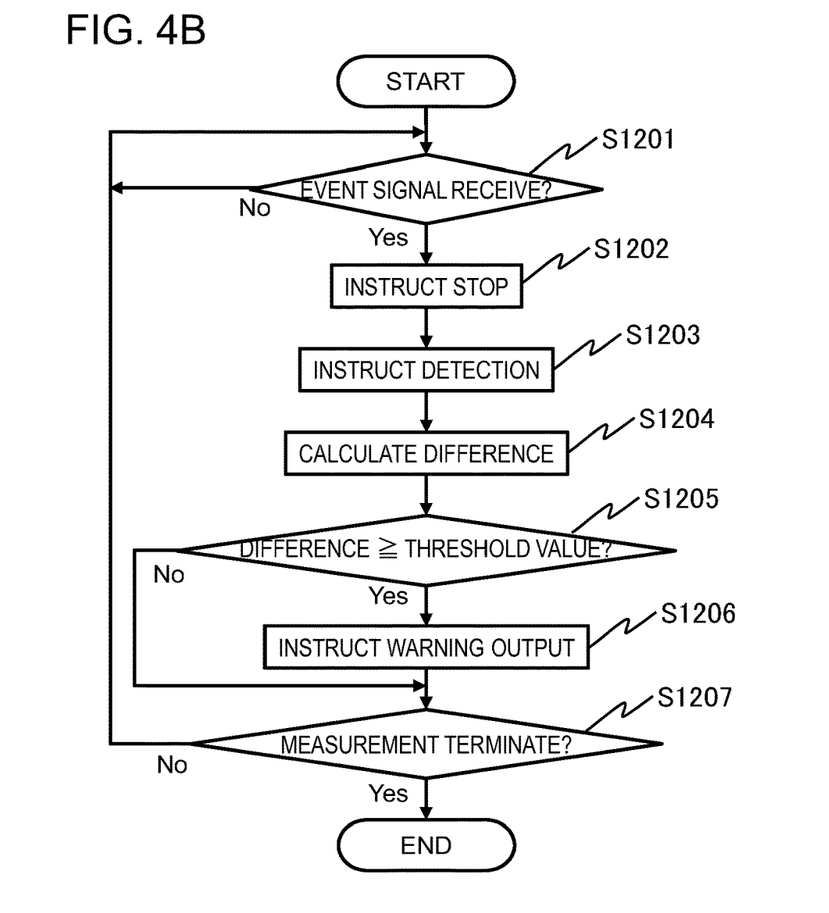
FIG. 4B is a flowchart of connector looseness detection processing according to the example embodiment of the present invention.

Next, a flow of the connector looseness detection processing by the measurement device 300 in the present example embodiment is described. Here, a case in which the predetermined signal to be outputted is a warning is used as an example. FIG. 4B is a flowchart of the connector looseness detection processing of the present example embodiment. This processing starts, for example, when the female connector 200 is connected. The DUT is connected to an end of the female connector 200 via a coaxial cable. This processing may also be triggered by an instruction from the user.

Upon receiving a predetermined event signal from the measurement part 320 (step S1201), the control part 312 outputs a stop instruction to the measurement part 320 (step S1202) and also issues a detection instruction to the sensor 311 (step S1203).

Upon receiving an end-face-to-end-face distance d as a detection result from the sensor 311 in response to the detection instruction, the control part 312 calculates a difference between the end-face-to-end-face distance d and the reference distance (step S1204).

The control part 312 compares the difference calculated with a threshold value (step S1205). If the difference is greater than or equal to the threshold value (S1205; Yes), that is, if the end-face-to-end-face distance d has changed from the reference distance by the threshold value or more, the control part 312 outputs a warning output instruction to the output part 313 (step S1206). The output part 313 outputs a warning in response to the warning output instruction.

The control part 312 returns to step S1201 and repeats the processing until it receives an instruction of terminating measurement (step S1207). Upon receiving the instruction of terminating measurement, the control part 312 terminates the processing. If the difference is less than the threshold value in step S1205, the control part 312 goes directly to step S1207.

The instruction of terminating measurement may be entered by the user, or a receipt of a predetermined event signal may be used as the instruction of terminating measurement.

Although, in the flowchart used in the above description, a plurality of processes (processings) is described in sequence, an execution order of performing each process— is not limited by an order of description thereof. It is possible to change an order of processes illustrated in the drawing within an extent that will not offer any problem to content, for example, executing each processing in parallel and so on.

As explained above, according to the present example embodiment, a through hole 119 is formed in the external conductor 101 of the male connector 100, which is structured to prevent misalignment, on the side of the measurement device 300, for passing the optical fiber 318 of the sensor 311 therethrough. Then, the optical fiber 318 is installed in the through hole 119, and the measurement device 300 detects the misalignment of the protruding portion 208 of the external conductor of the female connector 200 due to looseness of torque at the connection portion of the coaxial connector in a non-contact manner by the change of the end-face-to-end-face distance d. Here, for example, the end-face-to-end-face distance d at the completion of calibration using a calibration reference device is used as a reference distance.

Thus, according to the present example embodiment, the looseness of torque at the connection portion of the coaxial connector after a connection is completed can be detected with the simple configuration of measuring the distance.

In the present example embodiment, a through hole 119 with a diameter approximately the same size as that of the optical fiber 318 is made in the external conductor portion of the male connector 100 provided in the measurement device 300. Then, the optical fiber 318 of the sensor 311 is inserted therethrough and the end-face-to-end-face distance d is detected. Thus, the detection of the end-face-to-end-face distance d by irradiating a laser beam is performed in a space sealed with the external conductor 101 and the external conductor 204. Therefore, an influence of the laser beam to the outside can be eliminated as much as possible.

According to the present example embodiment, a looseness detection is performed in cooperation with a measurement processing of the measurement device 300. That is, a detection is performed upon receiving a signal from the measurement part 320 when a predetermined event occurs. For example, by using the detection result when the signal is received at the completion of calibration as the reference value, it is easy to obtain the reference value when determining whether or not a warning is necessary.

Furthermore, in the present example embodiment, the measurement device 300 temporarily stops the processing on the side of the measurement part 320 at a predetermined event as described above in the measurement device 300, and it performs the end-face-to-end-face distance d detection during that period. The predetermined event is, for example, as described above, while the measurement part 320 repeatedly sweeps the frequency of the input/output signals from a set lower measurement limit to a set upper measurement limit, a timing when the sweep direction is switched because the frequency has reached the set upper measurement limit. The measurement device 300 also performs detection at a timing when the input/output signals is intentionally stopped. Thus, according to the present example embodiment, the measurement device 300 outputs a laser beam from the sensor 311 only when there is no input/output signals to the measurement device 300, therefore, an influence of the laser beam on the measurement data can be eliminated.

According to the present example embodiment, the reliability and accuracy of the data measured by the measurement device 300 can be ensured. Calibration is performed with the measurement device 300 and the coaxial cable tightened with the default torque, and subsequent measurements can be performed while maintaining that state. The measurement values obtained while the state at the time of calibration is maintained, and the measurement values obtained when the connection portion with the coaxial connector is loosened from a predetermined (default) torque and the state at the time of calibration is collapsed will be different. The latter does not guarantee an accuracy of the measurement values. However, according to the present example embodiment, such a situation can be avoided.

In addition, since the measurement accuracy can be ensured, the need for re-measurement and other backward labor can be reduced. In particular, when the measurement device 300 is a VNA, a measurement of an S (Scattering)

parameter should be repeated by reconnecting the coaxial cable to multiple locations (ports) on the DUT. In such a case, the user pays attention to connection portions of the coaxial cable on the DUT side where the coaxial cable is switched to connect but does not pay attention to the connection portion on the VNA side. For example, repeating connection changes or moving the DUT in a state to which the coaxial cable is connected may cause a tension on the coaxial cable. Even if the tension caused is applied to the connection portion between the coaxial cable and the coaxial connector of the VNA through the coaxial cable so that looseness of torque occurs at the connection portion of the coaxial connector of the VNA side, the user continues the measurement without noticing. For example, even if the user notices the looseness of torque when disconnecting the coaxial cable from the VNA after the measurement, the user will have to redo the entire measurement from the perspective of ensuring the reliability of the measurement data because it is unclear at what point the looseness of torque has occurred. According to the present example embodiment, the user can notice the looseness of torque at the connection portion of the coaxial connector at the time when it affects the measurement data, thus minimizing the need for backward labor.

<Variation 1>

The control part 312 outputs detection instructions to the sensor 311 in response to the occurrence of predetermined events in the measurement part 320, but a timing for outputting the detection instructions is not limited thereto. For example, the control part 312 may output detection instructions at predetermined time intervals. Both may also be combined.

<Variation 2>

The sensor 311 detects the end-face-to-end-face distance d according to detection instructions by the control part 312, but a timing of detection is not limited thereto. For example, it may periodically detect the end-face-to-end-face distance d independently of the control part 312 and without detection instructions. Both may also be combined.

<Variation 3>

In the above embodiment and variations, each time the sensor 311 detects the distance, the control part 312 calculates the difference between the distance and the reference distance, but a timing for calculating the difference is not limited thereto. For example, the sensor 311 may detect the distance at predetermined time intervals and store the results, and the control part 312 may be configured to calculate the difference using the most recent detection value (the newest detection value) in response to the occurrence of a predetermined event.

For example, the sensor 311 detects the end-face-to-end-face distance d every second, and if a given event occurs when 9.4 seconds have elapsed from the starting point, the control part 312 calculates the difference using the detection value at the 9th second.

<Variation 4>

In the above embodiment and variations, the control part 312 is configured to output a predetermined signal to the output part 313 when the difference becomes equal to or greater than the threshold value, but the output signal is not limited thereto. For example, the control part 312 may be configured to further output a signal indicating that the difference has reached or exceeded the threshold value to an outside of the connector looseness detection part 310.

As the outside, it may be configured to output, for example, to the measurement part 320. The measurement part 320 may then be configured to stop the measurement, for example, upon receiving the signal. As a result, when the calibrated state is considered to be collapsed, the measurement device 300 automatically stops the measurement. Thus, it is possible to avoid measurement being performed in a state where the calibrated state is collapsed.

<Variation 5>

In the above embodiment and variations, the control part 312 is configured to output only when the difference becomes equal to or greater than the threshold value, but output timing is not limited thereto. For example, the control part 312 may be configured to output the difference itself as well as a calculation time (or detection time) each time the difference is calculated. This allows the user to grasp the change in the difference over time. Since the user can grasp the change trend of the difference, the user can stop and adjust the measurement before the difference exceeds the threshold value, and so on. At this time, the threshold value may also be changed by user input.

<Variation 6>

In the above embodiment and variations, the sensor 311 is provided with one optical fiber 318, and the end-face-to-end-face distance d is detected at one location (single point). If the torque at the connection portion of the coaxial connector is loosened, the displacement will shift in parallel, so there is no problem with a single detection point.

However, in order to reduce the variation in accuracy of the individual measurement device 300, it may be configured to detect the distance at multiple points. In this case, many through holes 119 are formed in the external conductor 101, and an optical fiber 318 with a laser beam exit port is inserted in each hole. For example, the distance may be measured diagonally or crosswise.

<Variation 7>

In the above embodiment and variations, the sensor 311, which detects distance by irradiating a laser beam in non-contact manner, is used to detect looseness of torque at the connection portion of the coaxial connector, but the sensor to be used is not limited thereto. For example, a pressure sensor may be used. In this case, a metal or other material is used as a sensing part instead of the optical fiber 318, and the tip face 317 thereof is placed near the tip face 201 of the protruding portion 208 of the female connector 200 or at the location where it is installed. The displacement pressure from the tip face 201 is then detected at the detector.

While example embodiment and variations of the present invention have thus been described, the present invention is not limited thereto. Further variations, substitutions, or adjustments can be made without departing from the basic technical concept of the present invention. For example, the configurations of the networks and the configurations of the elements illustrated in the drawings have been used only as examples to facilitate understanding of the present invention. That is, the present invention is not limited to the configurations illustrated in the drawings.

Finally, suitable modes of the present invention will be summarized.

[Mode 1]

A detection device that fits a second connector provided on a tip of a cable and detects looseness at a connection portion between a first connector to which the cable is connected and the second connector, comprising:

a sensor that detects a distance to a tip face of the second connector in a sealed space formed in a state where the first connector and the second connector are fitted to each other;

a controller that gives an output instruction to output a predetermined signal when the distance has changed by a predetermined threshold value or more from a reference distance, the reference distance being the distance at a predetermined reference time; and an output device that outputs the predetermined signal according to the output instruction.

[Mode 2]

In the detection device according to mode 1, it is preferable that the sensor is an optical sensor that detects a distance to an object using a light emitted from a tip of an optical fiber, and the optical fiber is inserted into a through hole that passes through an external conductor provided in the first connector at a position opposite the tip face of the second connector.

[Mode 3]

In the detection device according to mode 1 or 2, it is preferable that wherein the cable is a coaxial cable.

[Mode 4]

In the detection device according to any one of modes 1 to 3, it is preferable that the predetermined signal is a signal that warns a user.

[Mode 5]

A measurement device, comprising:

the detection device according to mode 1;

the first connector;

at least a processor, and a memory in circuit communication with the processor, wherein the processor is configured to execute program instructions stored in the memory to implement:

a measurement part that measures a characteristic value of a device under test connected by the cable.

[Mode 6]

In the measurement device according to mode 5, it is preferable that the controller causes the sensor to measure the distance under no signal transmission/reception between the measurement part and the device under test.

[Mode 7]

In the measurement device according to mode 5 or 6, it is preferable that the measurement part outputs an event signal in response to an occurrence of a predetermined event to the controller;

the controller causes the sensor to detect the distance upon receipt of the event signal; and the event includes end of calibration, start of frequency sweep, and end of frequency sweep.

[Mode 8]

In the measurement device according to mode 7, it is preferable that the controller instructs the measurement part to stop a measurement before causing the sensor to measure the distance upon receipt of the event signal.

[Mode 9]

In the measurement device according to any one of modes 5 to 8, it is preferable that the reference time is a time of which a calibration of a measurement system including the measurement device and a calibration reference device is completed.

[Mode 10]

A method for detecting a connector looseness by a computer provided in a measurement device, the method comprising:

detecting a distance from a sensor to a tip face of a second connector in a sealed space formed in a state where a first connector and the second connector are fitted to each other, the first connector being attached to the measurement device, the second connector being provided on a tip of a cable;

giving an output instruction to output a predetermined signal when the distance has changed by a predetermined threshold value or more from a reference distance, the reference distance being the distance at a predetermined reference time; and outputting the predetermined signal according to the output instruction.

[Mode 11]

A non-transitory computer-readable medium storing therein a program causing a computer to execute processing comprising:

detecting a distance from a sensor to a tip face of a second connector in a sealed space formed in a state where a first connector and the second connector are fitted to each other, the first connector being attached to the measurement device, the second connector being provided on a tip of a cable;

giving an output instruction to output a predetermined signal when the distance has changed by a predetermined threshold value or more from a reference distance, the reference distance being the distance at a predetermined reference time; and outputting the predetermined signal according to the output instruction. The above modes 10 and 11 can be expanded in the same way as mode 5 is expanded to modes 6 to 9.

The disclosure of each of the above PTLs, etc. is incorporated herein by reference thereto. Modifications and adjustments of the example embodiments or examples are possible within the scope of the overall disclosure (including the claims) of the present invention and based on the basic technical concept of the present invention. Various combinations or selections of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. Especially, as to numerical value ranges disclosed in the present specification, even if the specification does not particularly disclose numerical values or small ranges included in the ranges, these values and ranges should be deemed to have been concretely disclosed.

REFERENCE SIGNS LIST

100: male connector,
101: external conductor,
102: screw thread,
103: central conductor,
109: groove portion,
119: through hole,
200: female connector,
201: tip face,
204: external conductor,
205: screw portion,
206: central conductor,
208: protruding portion,
209: region,
300: measurement device,
310: connector looseness detection part (detection device),
310a: connector looseness detection device, 311: sensor,
312: control part,
313: output part,
317: tip face,
318: optical fiber,
320: measurement part,
391: CPU,
392: storage device,
393: input/output I/F,
394: input device,
395: output device

What is claimed is:

1. A measurement device, comprising:
a first connector;
a detection device that fits a second connector provided on a tip of a cable and is configured to detect looseness at a connection portion between the first connector, to which the cable is connected, and the second connector, the detection device comprising:
a sensor configured to detect a distance to a tip face of the second connector in a sealed space formed in a state where the first connector and the second connector are fitted to each other;
a controller configured to give an output instruction to output a predetermined signal when the distance has changed by a predetermined threshold value or more from a reference distance, the reference distance being the distance at a predetermined reference time; and
an output device configured to output the predetermined signal according to the output instruction;
at least a processor; and
a memory in circuit communication with the processor,
wherein the processor is configured to execute program instructions stored in the memory to implement:
a measurement part that measures a characteristic value of a device under test connected by the cable,
wherein the measurement part is configured to output an event signal in response to an occurrence of a predetermined event to the controller,
wherein the controller is configured to cause the sensor to detect the distance upon receipt of the event signal, and
wherein the event includes at least one of end of calibration, start of frequency sweep, and end of frequency sweep.

2. The measurement device according to claim 1, wherein:
the sensor is an optical sensor configured to detect the distance to an object using a light emitted from a tip of an optical fiber, and
the optical fiber is inserted into a through hole that passes through an external conductor provided in the first connector at a position opposite the tip face of the second connector.

3. The measurement device according to claim 1, wherein the cable is a coaxial cable.

4. The measurement device according to claim 1, wherein the predetermined signal is a signal that warns a user.

5. The measurement device according to claim 1, wherein the controller is configured to cause the sensor to detect the distance under no signal transmission/reception between the measurement part and the device under test.

6. The measurement device according to claim 1, wherein the controller is configured to instruct the measurement part to stop a measurement before causing the sensor to measure the distance upon receipt of the event signal.

7. The measurement device according to claim 1, wherein the reference time is a time of which a calibration of a measurement system including the measurement device and a calibration reference device is completed.

8. The measurement device according to claim 1, wherein the sensor is an optical sensor that detects a distance to an object using a light emitted from a tip of an optical fiber, and
the optical fiber is inserted into a through hole that passes through an external conductor provided in the first connector at a position opposite the tip face of the second connector.

9. The measurement device according to claim 1, wherein the cable is a coaxial cable.

10. The measurement device according to claim 1, wherein the predetermined signal is a signal that warns a user.

11. A method for detecting a connector looseness by a computer provided in a measurement device, the method comprising:
detecting, by a detection device, a distance from a sensor to a tip face of a second connector in a sealed space formed in a state where a first connector and the second connector are fitted to each other, the first connector being attached to the measurement device, the second connector being provided on a tip of a cable,
wherein the detection device fits the second connector and detects looseness at a connection portion between the first connector, to which the cable is connected, and the second connector;
giving, by a controller, an output instruction to output a predetermined signal when the distance has changed by a predetermined threshold value or more from a reference distance, the reference distance being the distance at a predetermined reference time;
outputting the predetermined signal according to the output instruction;
measuring a characteristic value of a device under test connected by the cable;
outputting an event signal in response to an occurrence of a predetermined event to the controller; and
causing, by the controller, the sensor to detect the distance upon receipt of the event signal,
wherein the event includes end of calibration, start of frequency sweep, and end of frequency sweep.

12. The method according to claim 11, wherein:
the sensor is an optical sensor that detects the distance to an object using a light emitted from a tip of an optical fiber, and
the optical fiber is inserted into a through hole that passes through an external conductor provided in the first connector at a position opposite the tip face of the second connector.

13. The method according to claim 11, wherein the cable is a coaxial cable.

14. The method according to claim 11, wherein the predetermined signal is a signal that warns a user.

15. The method according to claim 11, further comprising:
measuring a characteristic value of a device under test connected by the cable.

16. The method according to claim 15, further comprising:
causing the sensor to detect the distance under no signal transmission/reception between the measurement device and the device under test.

17. The method according to claim 15, further comprising:

outputting an event signal in response to an occurrence of a predetermined event; and causing the sensor to detect the distance upon being outputted the event signal;

wherein the event includes end of calibration, start of frequency sweep, and end of frequency sweep.

18. The method according to claim 17, further comprising:

instructing to stop a measurement before causing the sensor to measure the distance upon receipt of the event signal.

\* \* \* \* \*